United States Patent
Nagano et al.

(10) Patent No.: US 7,159,019 B2
(45) Date of Patent: Jan. 2, 2007

(54) INFORMATION COLLECTION APPARATUS AND METHOD

(75) Inventors: Shinichi Nagano, Minato-ku (JP); Yasuyuki Tahara, Minato-ku (JP); Tetsuo Hasegawa, Minato-ku (JP); Akihiko Ohsuga, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 10/012,529

(22) Filed: Dec. 12, 2001

(65) Prior Publication Data
US 2002/0078133 A1    Jun. 20, 2002

(30) Foreign Application Priority Data
Dec. 14, 2000    (JP)    ............... P2000-380728

(51) Int. Cl.
*G06F 15/173* (2006.01)
(52) U.S. Cl. .............. 709/223; 707/10; 709/201; 709/217; 709/226
(58) Field of Classification Search ........... 709/226, 709/201, 217, 223; 707/10
See application file for complete search history.

(56) References Cited

U.S. PATENT DOCUMENTS

| | | | | |
|---|---|---|---|---|
| 5,801,750 A | * | 9/1998 | Kurihara | 455/3.02 |
| 6,094,680 A | * | 7/2000 | Hokanson | 709/223 |
| 6,212,192 B1 | * | 4/2001 | Mirashrafi et al. | 370/401 |
| 6,633,873 B1 | * | 10/2003 | Nakamura | 707/10 |
| 6,633,877 B1 | * | 10/2003 | Saigh et al. | 707/10 |
| 6,721,794 B1 | * | 4/2004 | Taylor et al. | 709/231 |
| 6,785,728 B1 | * | 8/2004 | Schneider et al. | 709/229 |

FOREIGN PATENT DOCUMENTS

JP    2000-057040    2/2000

OTHER PUBLICATIONS

A. Fuggetta, et al., "Understanding Code Mobility", IEEE Transactions on Software Engineering, vol. 24, No. 5, May 1998, pp. 342-361.
L. Ismail, et al., "A Performance Evaluation of the Mobile Agent Paradigm", Nov. 1999, pp. 306-313.
D. Deugo, "Mobile Agent Messaging Models", 2001 IEEE, pp. 278-286.
Reference # 2 cited in Office Action for JPO Application No. 2000-380728, dated Sep. 30, 1997, pp. 307-324.

* cited by examiner

*Primary Examiner*—David Wiley
*Assistant Examiner*—Kyung Hye Shin
(74) *Attorney, Agent, or Firm*—Banner & Witcoff, Ltd.

(57) ABSTRACT

An apparatus collects information stored in a host computer through a network. A correspondence acquirement unit acquires a correspondence between an information identifier of requested information and host identifiers of a plurality of host computers each of which stores the requested information. A first decision unit decides at least one host computer to retrieve the requested information by referring to the correspondence. A second decision unit decides a retrieval method used for each host computer decided by the first decision unit from a plurality of retrieval methods. A retrieval unit indicates retrieval of the requested information based on the retrieval method decided by the second decision unit and each host computer decided by the first decision unit.

20 Claims, 10 Drawing Sheets

HOST ID

| | A | B | C | D | E |
|---|---|---|---|---|---|
| 1 | M | C | C | | |
| 2 | C | M | | | |
| 3 | M | C | | | |
| 4 | C | | M | | |
| 5 | | M | | | |
| 6 | | | M | | |

INFORMATION ID

M : MASTER
C : COPY

FIG. 5

HOST ID

| | A | B | C | D | E |
|---|---|---|---|---|---|
| 1 | M | C | C | | |
| 2 | C | M | | | |
| 3 | M | C | | | |
| 4 | C | | M | | |
| 5 | | M | | | |
| 6 | | | M | | |
| 7 | M | | | | |
| 8 | | M | | | |

INFORMATION ID

M : MASTER
C : COPY

FIG. 9

INFORMATION COLLECTION APPARATUS AND METHOD

CROSS-REFERENCE TO RELATED APPLICATIONS

This application is based upon and claims the benefit of priority from the prior Japanese Patent Application No. 2000-380728, filed on Dec. 14, 2000, the entire contents of which are incorporated herein by reference.

FIELD OF THE INVENTION

The present invention relates to information collection apparatus and method for retrieving information from a host computer by accessing through a network.

BACKGROUND OF THE INVENTION

Recently, in proportion to the rapid development of computer networks, information is provided through networks, and many users acquire information from networks. Furthermore, the quantity of information provided through networks increases, and a frequency to update the information becomes high (For example, several times every day). Accordingly, it is important how to effectively retrieve and collect information including Internet information. Furthermore, similar status exists in LAN inside company. If LAN inside home widely spreads, similar status also exists.

As one information retrieval method, a remote retrieval is often utilized. In the remote retrieval, a retrieval message is sent to a host computer storing the information whenever one retrieval request is input, and the retrieved information is received. However, if a plurality of retrieval requests is continuously input, sending/receiving of the retrieval messages creates a bottleneck.

As another retrieval method, a mobile agent retrieval, which can realize smooth retrieval, is utilized. In the mobile agent retrieval, a retrieval program storing a retrieval request is sent to a retrieval destination host, and the retrieval is locally executed in the retrieval destination host. Even if a large number of retrieval requests are input, sending and receiving times of the retrieval message are short. However, the retrieval program storing the retrieval result moves from one retrieval destination host to another retrieval destination host. Accordingly, in case that moving times are long, the communication cost becomes high.

On the other hand, by mirroring technique of a Web server or a database, a copy of the desired information often exists in a network in addition to a master of the desired information. Furthermore, in view of information contents or retrieval purpose, it does not matter that a copy of the desired information is obtained instead of the original. However, in a plurality of selection items including one master and at least one copy, it is unknown how to select an item to be accessed and how to access the selected item. No guidance to effectuate the information retrieval is given for the information collection system.

BRIEF SUMMARY OF THE INVENTION

It is an object of the present invention to provide an information collection apparatus and method for effectively retrieving information from a host computer through a network.

According to an aspect of the present invention, there is provided an apparatus for collecting information stored in a host computer through a network, comprising: a correspondence acquirement unit configured to acquire a correspondence between an information identifier of requested information and host identifiers of a plurality of host computers, each host computer storing the requested information; a first decision unit configured to decide at least one host computer to retrieve the requested information by referring to the correspondence; a second decision unit configured to decide a retrieval method used for each host computer decided by said first decision unit from a plurality of retrieval methods; and a retrieval execution unit configured to indicate retrieval of the requested information based on the retrieval method decided by said second decision unit and each host computer decided by said first decision unit.

Further in accordance with another aspect of the present invention, there is also provided a method for collecting information stored in a host computer through a network, comprising: acquiring a correspondence between an information identifier of requested information and host identifiers of a plurality of host computers, each host computer storing the requested information; deciding at least one host computer to retrieve the requested information by referring to the correspondence; deciding a retrieval method used for each host computer decided from a plurality of retrieval methods; and indicating retrieval of the requested information based on the retrieval method and the at least one host computer.

Further in accordance with another aspect of the present invention, there is also provided a computer program product, comprising: a computer readable program code embodied in said product for causing a computer to collect information stored in a host computer through a network, said computer readable program code having: a first program code to acquire a correspondence between an information identifier of requested information and host identifiers of a plurality of host computers, each host computer storing the requested information; a second program code to decide at least one host computer to retrieve the requested information by referring to the correspondence; a third program code to decide a retrieval method used for each host computer decided from a plurality of retrieval methods; and a fourth program code to indicate retrieval of the requested information based on the retrieval method and the at least one host computer.

BRIEF DESCRIPTION OF THE DRAWINGS

FIG. 5 is a schematic diagram showing one example of a management table.

FIG. 9 is a schematic diagram showing another example of the management table.

DETAILED DESCRIPTION OF THE INVENTION

Figure 1:
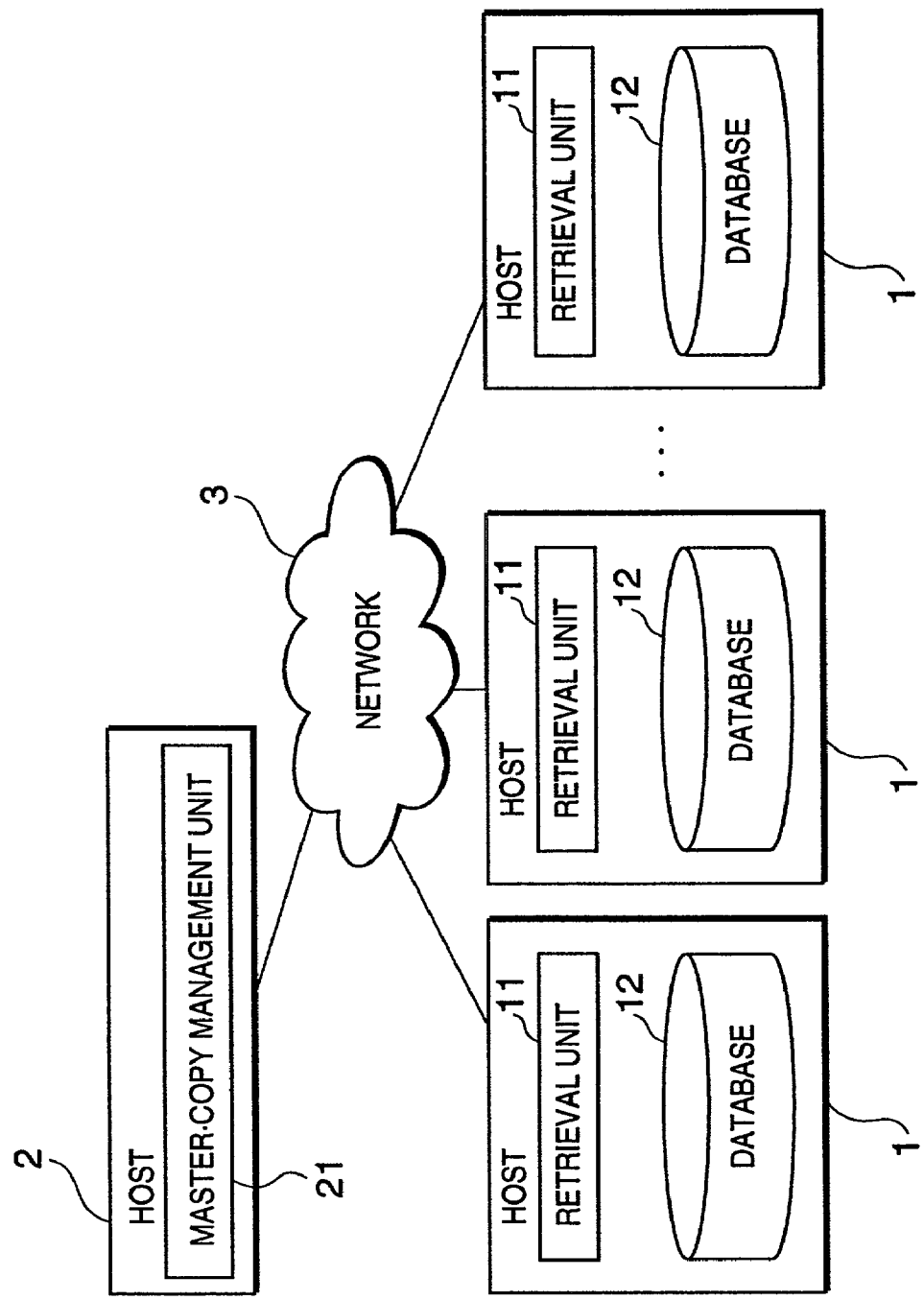
FIG. 1 is a component example of a network system according to various embodiments of the present invention.

Hereinafter, various embodiments of the present invention will be explained by referring to the drawings.

FIG. 1 is a component example of the network system according to various embodiments of the present invention. In this system, a plurality of computers (Hereinafter, this computer is called "a host") communicates through a network 3. The host is discriminatable by a host identifier (Hereinafter, it is called "a host ID") such as a host name, or IP address. The network 3 is, for example, Internet, LAN inside the company, LAN inside the home, or these connected one. In short, the network 3 is applicable to any connected elements. Furthermore, all parts of the network 3 may be composed by wired network, a wireless network, or at least one part of the network 3 may be composed by wireless network.

The host may be a computer or an apparatus or a device (For example, an information processing apparatus, a personal cellular phone) other than a computer (Hereinafter, it is explained in case of the host). A plurality of the hosts 1 (a host having a function of information retrieval node) each respectively includes a database 12 to store a master or a copy of some information. Each information is discriminatable by an information identifier (Hereinafter, it is called "an information ID"). Furthermore, the host 1 includes a retrieval unit 11 to retrieve/collect information through the network (Briefly, information of desired information ID is retrieved/collected from the database 12 in its own host or another host). The database 12 may be actually contained in the host 1. Alternatively, the database 12 is actually connected to outside of the host 1 but may seem to be contained in the host 1 from a view point of another host. Furthermore, a format of the information is not specially limited. In the present invention, the information of single format may be processed or the information of a plurality of formats may be processed.

One case that the host 1 has a function to utilize the acquired information (For example, a display function, an editing function, a playback function) and the other case that the host 1 does not have the function, take place. In latter case, the host 1 transmits the acquired information to another host/apparatus on the network or outside the network in order to utilize the information. Alternatively, after necessary software is installed to the host 1, the host 1 utilizes the information.

In the network system shown in FIG. 1, a master of the information is stored in a database 12 of any host 1. In case that a copy of the information exists, the copy is stored in a database 12 of at least one host 1 different from the host 1 including the master of the information. Ordinarily, the master of each information is updated at a predetermined timing, and the copy of each information is updated after a predetermined time lag passes from the update timing of the master. Accordingly, the content of the copy is the same as the content of the master or a previous version of the master.

The retrieval unit 11 can be a component to always retrieve both the master and the copy of all information IDs, a component to alternatively retrieve the master only, either the master or the copy, the copy only of all information IDs in response to a request from outside, or a component to alternatively retrieve the master only, either the master or the copy, the copy only of each information ID in response to a request from outside. The retrieval unit 11 may be a component not to retrieve the copy only, a component to retrieve the master only of all information IDs. Furthermore, the retrieval unit 11 may have a plurality of modes each corresponding to above-mentioned component. When a user sets his desired component, he can select a mode corresponding to the component through an input device. Other various variations can be taken into consideration.

In the network 3, a host 2 (having a function of management server) includes a master copy management unit 21 to manage the information stored in the database 12 of each host 1 by distinguishing between the master and the copy. Briefly, the master•copy management unit 21 manages that the master and the copy of the information of which information ID respectively exists in the host 1 of which host ID. For example, the host 2 (the master•copy management unit 21) collects correspondence relation information among the information ID, the host ID, and the distinction between the master and the copy by exchanging a message with each host 1 periodically. Each host 1 acquires the host ID of the host storing the master of the information of desired information ID by inquiring of the host 2. If the copy of the desired information exists, each host 1 can acquire the host ID of at least one host 1 storing the copy. In the hosts 1 each having the retrieval function, some host 1 may not have the database. In this case, in the same way as the host 1 having the database, some host 1 can retrieve the database in the host 1. Furthermore, in FIG. 1, the master copy management unit 21 is installed in the host 2 different from the host 1 having the retrieval unit 11. However, the master•copy management unit 21 may be installed in at least one host 1 having the retrieval function (may be installed in all hosts 1).

Figure 2:
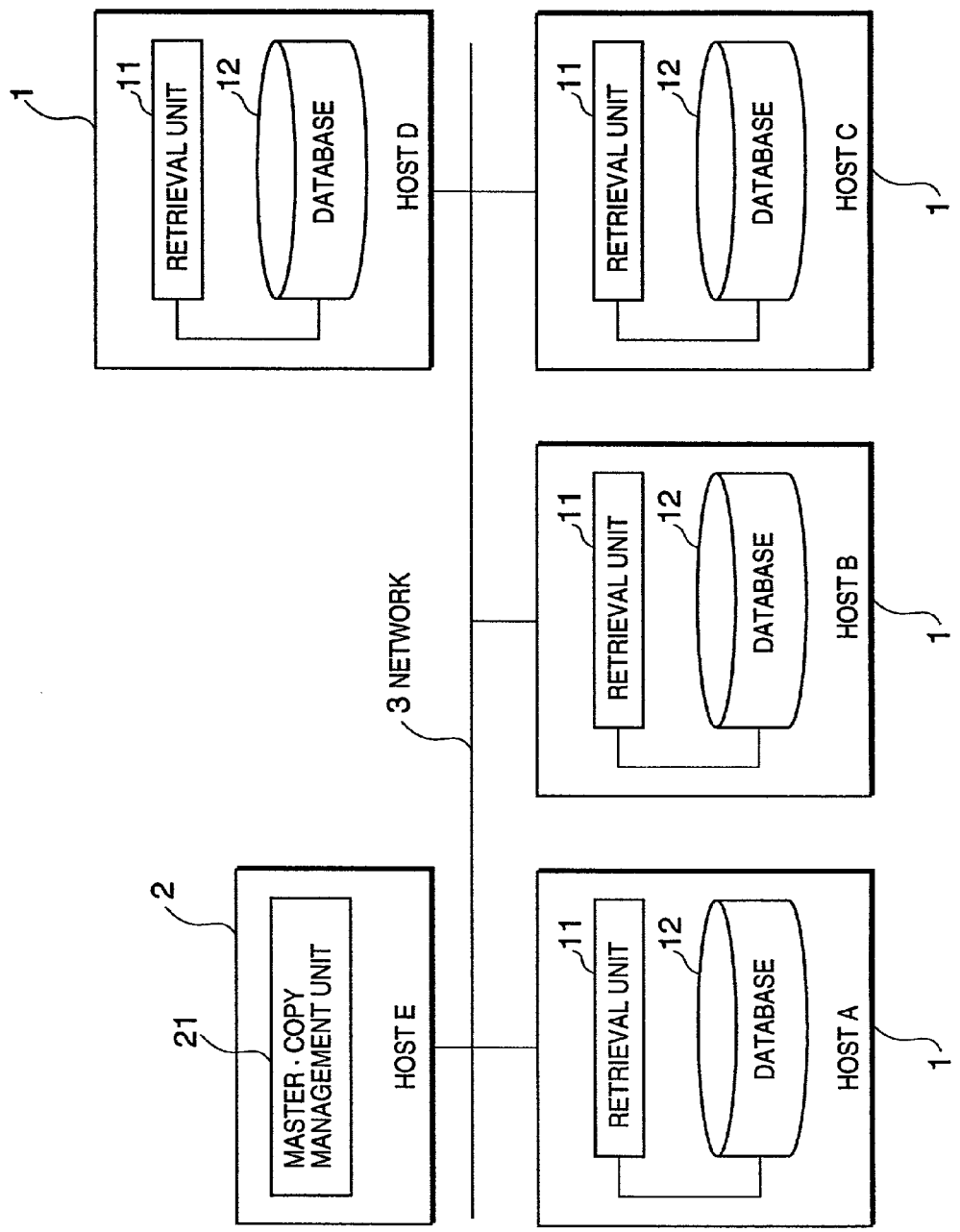
FIG. 2 is a concrete example of the network system according to various embodiments of the present invention.
Figure 3:
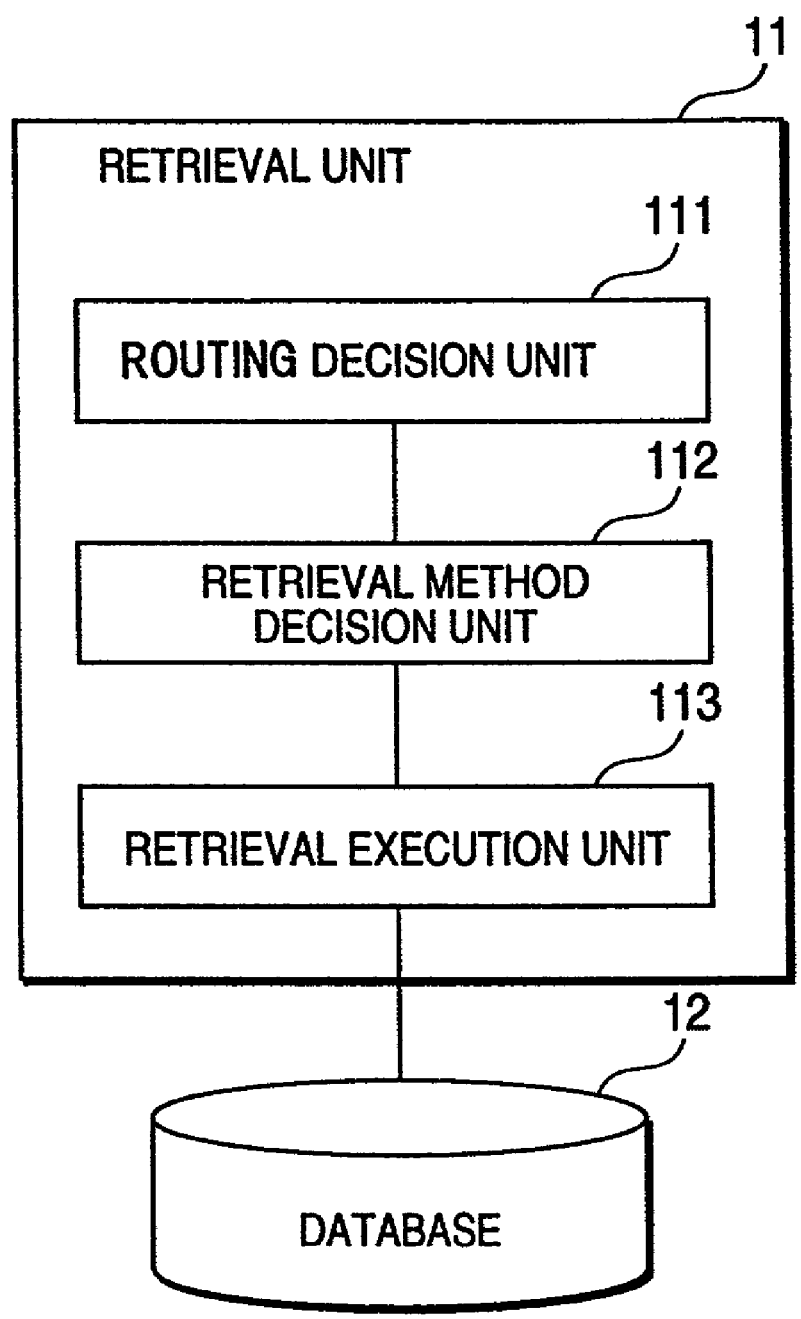
FIG. 3 is a block diagram of one example of a retrieval unit according to various embodiments of the present invention.
Figure 4:
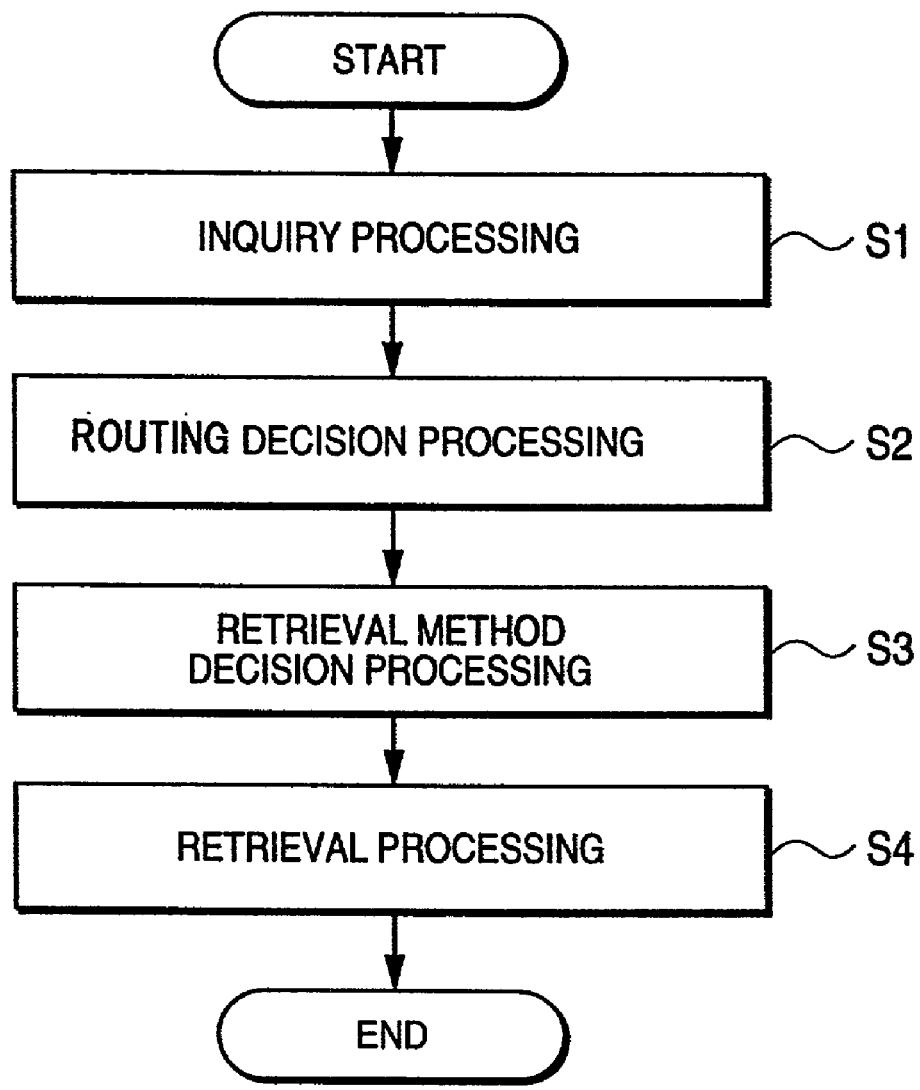
FIG. 4 is a flow chart of retrieval processing according to various embodiments of the present invention.

Hereinafter, while explaining using an example, assume that four hosts A~D which respectively have a retrieval unit 11 and a database 12, and one host E which has a master•copy management unit 21 exist in a network system. FIG. 2 is a component example of this network system. FIG. 3 is a block diagram of the retrieval unit 11 in the host 1. In FIG. 3, three parts related to the retrieval function are shown, and parts related to the communication function and input/output functions are omitted. FIG. 4 is a flow chart of retrieval processing of the host 1.

As shown in FIG. 3, the retrieval unit 11 includes a routing decision unit 111, a retrieval method decision unit 112, and a retrieval execution unit 113. First, the information ID of the desired information is input to the retrieval unit 11. In addition to this, an indication that the retrieval object is the master and the only object, or either the master or the copy, may be input to the retrieval unit 11. The routing decision unit 111 inquires of a host functioning as management server (Briefly, the host E having the master•copy management function 21) a host ID of the host storing the desired information by using the information ID as a retrieval key. Then, the routing decision unit 111 obtains the retrieval result from the host E (S1). In case of inquiry, a plurality of inquiry methods may be selectively utilized. Concretely, a method for always inquiring both the host storing the master and the host storing the copy, a method for respectively inquiring any of the host storing the master, the host storing the copy, both the host storing the master and the host storing the copy for each information ID, a method for uniformly inquiring any of the host storing the master, the host storing the copy, both the host storing the master and the host storing the copy for all information IDs, are selectively utilized. It is desirable that inquiry processing of a plurality of the information IDs is executed by one time of inquiry. Furthermore, in case of inquiring both the host storing the master and the host storing the copy, the host 2 may send back a pair of the information ID and the host ID to the host 1, or may send back a group of the information ID, the host ID, and a flag representing whether the information of the information ID is the master or the copy. If its own host 1 has the master•copy management unit 21, its own host 1 executes a communication between a retrieval process and a master•copy management process.

Next, the routing decision unit 111 determines which host will retrieve the information of requested information ID based on a pair of the requested information ID and the host ID included in a response from the host 2 (S2). In this case, for example, by using an evaluation parameter such as a number of requested information stored in each host, the routing decision unit 111 determines the host IDs of hosts of which a number of the hosts to retrieve the desired information is minimum. In the routing decision unit 111, a part for inquiry processing and a part for host decision processing may be separate.

Next, the retrieval method decision unit 112 determines a retrieval method for each host based on the decision result of the routing decision unit 111 (S3). In this case, the retrieval method having the minimum retrieval time cost is selected from a plurality of retrieval methods by using an evaluation parameter such as a retrieval execution time, a communication time, a size of the retrieval request, and a size of the information.

Next, the retrieval execution unit 113 actually accesses the database in the host of the host ID determined by the routing decision unit 111 by using the retrieval method determined by the retrieval method decision unit 112 (S4). In the present embodiment, a remote retrieval and a mobile agent retrieval can be utilized. In the remote retrieval, a retrieval message is sent to a host storing the desired information whenever one retrieval request is received. In the mobile agent retrieval, a retrieval program storing a retrieval request is sent from a retrieval source host to a retrieval destination host (the host storing the desired information), a local retrieval is executed in the retrieval destination host, a retrieval result is added to the retrieval program, and the retrieval program is returned to the retrieval source host. Alternatively, in the mobile agent retrieval, the retrieval program storing the retrieval request is sent to the retrieval destination host, the local retrieval is executed in the retrieval destination host, the retrieval result is added to the retrieval program, the retrieval program moves to a next retrieval destination host, and the local retrieval is executed in the next retrieval destination host. In the same way, after the retrieval program goes round all retrieval destination hosts, the retrieval program returns to the retrieval source host.

FIG. 5 shows one example of a management table in the master•copy management unit 21 of the host 2 (management server). In FIG. 5, correspondence relation information among a host ID of each host, an information ID of the information stored in each host, and a flag, representing whether the information is a master or a copy, are uniformly stored in the management table. In this case, "M" represents a master and "C" represents a copy. The contents of the management table in FIG. 5 show the example of the case in FIG. 2. For example, in the host A, a master of information of the information ID "1", a copy of information of the information ID "2", a master of information of the information ID "3", and a copy of information of the information ID "4" are stored. As for the information of the information ID "1", the master is stored in the host A, a copy is stored in the host B, and a copy is stored in the host C.

Figure 6:
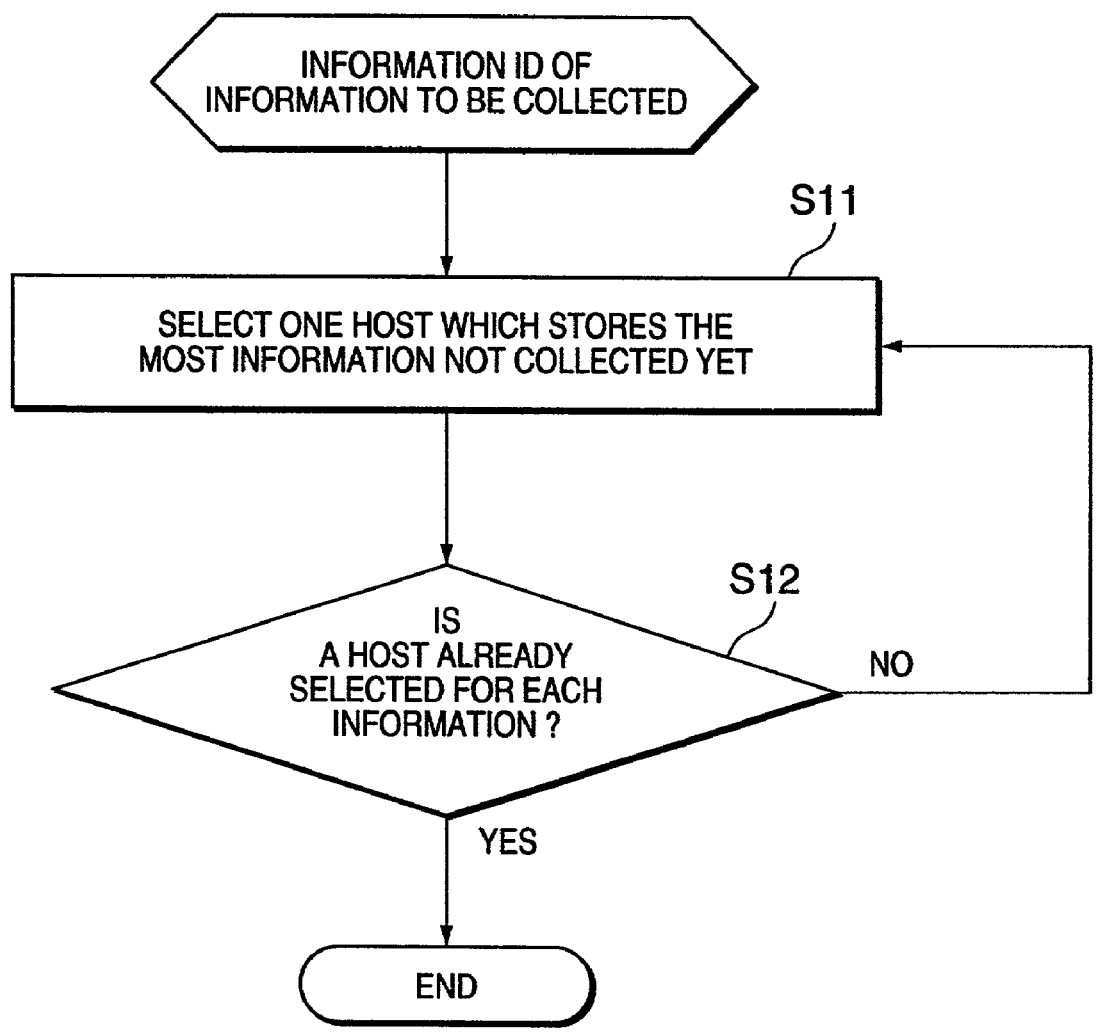
FIG. 6 is a flow chart of decision processing of a routing decision unit according to various embodiments of the present invention.

Hereinafter, the routing decision unit 111 in the retrieval unit 11 is explained in detail. FIG. 6 is a flow chart of processing of the routing decision unit 111. The routing decision unit 111 inputs the information ID of information to be retrieved through an input unit (not shown in FIG. 3). In addition to this, an indication, representing whether a retrieval object is a master or a copy, may be input. The routing decision unit 111 determines a set of a pair of the information ID and the host ID of a host to retrieve information of the information ID. As mentioned-above, in case of selecting the host to be retrieved, the routing decision unit 111 inquires of a host having the master•copy management unit 21 (Otherwise, the master•copy management unit 21 in its own host).

First, when the information ID is input, the routing decision unit 111 selects one host storing the largest number of requested information not retrieved yet (S11). In this case, if a plurality of hosts each of which satisfies the condition is obtained, the routing decision unit 111 selects one host from the plurality of hosts based on a predetermined selection policy.

For example, a method for selecting at least one host so that a number of hosts to be retrieved is minimum, a method for selecting a host which stores the requested information as the master, a method for preferably selecting its own host if its own host stores the requested information as the master or a copy, a method for selecting a host of higher priority by previously assigning a priority to each host, a method for selecting a host of which current load is lower, a method for selecting a host of which current communication status is better, a method for selecting a host at random, and combinations of above-mentioned methods may be utilized. Furthermore, instead of selecting one host storing the largest number of the requested information not retrieved yet, one host may be selected based on predetermined evaluation function. As a parameter of the predetermined evaluation function, a number of information to be retrieved in the host, a number of master of information to be retrieved in the host, priority order of each host, current load of the host, and current communication status of the host may be utilized.

For example, in the case shown in FIGS. 2 and 5, assume that the routing decision unit 111 in the host D inputs the information IDs "1~6", and retrieval object may be either the master or the copy. In this case, a host which stores the largest number of information of the information IDs "1~6" is the host A and the host B each of which stores four information. Assume that the host A is selected based on the predetermined selection policy. At this timing, four pairs of the information ID and the host ID "(1, A), (2, A), (3, A), (4, A)," are obtained.

When a host to retrieve the information is already assigned to each information ID (S12), the processing is completed. If a host is not assigned to at least one information ID yet (S12), the processing of S11 is executed again. In above-mentioned example, information of two information IDs "5, 6" is not retrieved yet. Accordingly, the processing is returned to S11. In this case, the host B and the host C respectively store information of one information ID not retrieved yet, and assume that the host B is selected. At this timing, one pair of the information ID and the host ID "(5, B)" is obtained. Furthermore, in above-mentioned example, information of one information ID "6" is not retrieved yet. Accordingly, the processing is returned to S11. In this case, the host C stores information of the information ID "6", and the host C is selected. At this timing, one pair of the information ID and the host ID "(6, C)" is obtained. As a result, a host to retrieve information is already assigned to all information IDs (S12) and the processing is completed. In this way, in case of collecting information of the information IDs "1~6" through the host D, by inputting the information IDs "1~6" to the routing decision unit 11 in the host D, six pairs of the information ID and the host ID "(1, A), (2, A), (3, A), (4, A), (5, B), (6, C)" are determined.

In case of receiving a retrieval request for a retrieval object that is the master only, first, a pair of an information ID and a host ID is determined for the information ID of which the retrieval object is the master only (This processing is called master•host decision processing). Next, as for information ID of which the retrieval object is either the master or the copy, processing shown in FIG. 6 is executed.

In case of selecting a host based on a number of information stored in each host at S11, as the number of information stored in each host, a method 1 for adding an information ID already decided at the master•host decision processing to the number of information of the same host, and a method 2 for not adding the information ID, may be selectively utilized. For example, in FIG. 5, assume that the information IDs "1~6" are input to the routing decision unit 111 in the host D and a retrieval object of the information IDs "5, 6" is the master information only (In other words, a retrieval object of the information IDs "1~4" is either the master or the copy.). In this case, in the master•host decision processing, two pairs of the information ID and the host ID "(5, B), (6, C)" are determined. Next, at S11 in FIG. 6, in case of above-mentioned method 2, the host A which stores information of four information IDs is selected, and four pairs of the information ID and the host ID "(1, A), (2, A), (3, A), (4, A)" are determined. On the other hand, at S11 in FIG. 6, in case of above-mentioned method 1, one of the host A and the host B each of which stores information of four information IDs is selected. If the host A is selected, four pairs of the information ID and the host ID "(1, A), (2, A), (3, A), (4, A)" are determined. If the host B is selected, four pairs of the information ID and the host ID "(1, B), (2, B), (3, B), (5, B)" are determined. In this case, the host A and the host C respectively store information of the information ID "4". If the host C is selected, one pair of the information ID and the host ID "(4, C)" is determined in addition to "(6, C)".

Furthermore, if the master information as the retrieval object is requested for all information IDs, all pairs of the information ID and the host ID are determined in the master•host decision processing. In this case, the processing shown in FIG. 6 is skipped.

In the above mentioned example, the pair of the information ID and the host ID is explained. However, if a set of the information ID, the host ID, and a flag representing whether the information is the master or the copy, are used (For example, a case that the retrieval method decision unit 112 refers to a distinction between the master and the copy, or a case that the retrieval result includes a flag representing whether the retrieved information is the master or the copy,), five sets "(1, A, M), (2, A, C), (3, A, M), (4, A, C), (5, B, M), (6, C, M)" are obtained.

Figure 7:
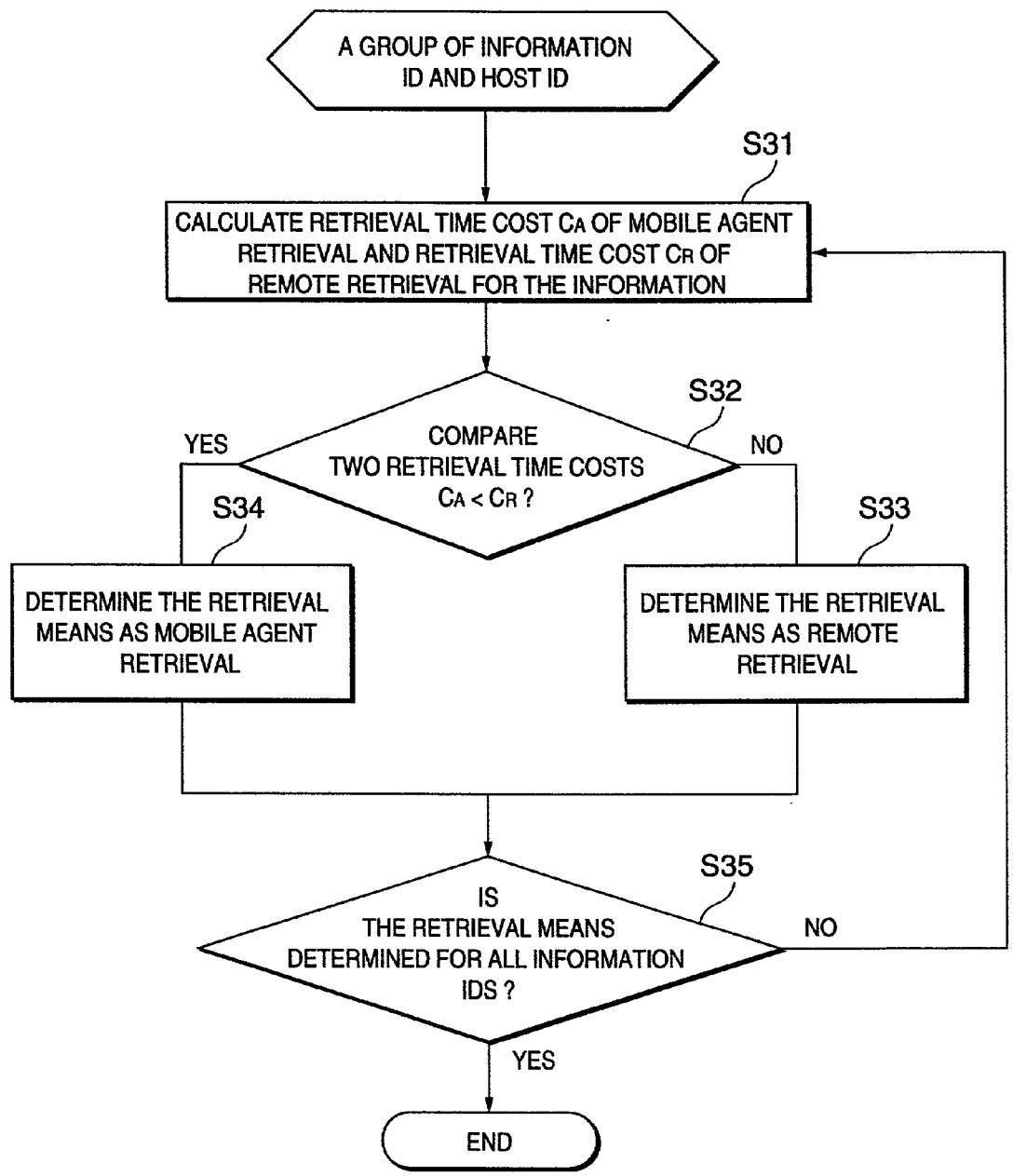
FIG. 7 is a flow chart of one decision processing of a retrieval method decision unit according to various embodiments of the present invention.

Next, the retrieval method decision unit 112 of the retrieval unit 11 is explained. FIG. 7 is a flow chart of the processing in the retrieval method decision unit 112. The retrieval method decision unit 112 receives the pair of the information ID and the host ID (Otherwise, the set of the information ID, the host ID and the flag representing master/copy) from the routing decision unit 111, and determines a retrieval method for each host. As mentioned-above, the remote retrieval and the mobile agent retrieval are included in selection item of the retrieval methods. First, the retrieval method decision unit 112 extracts one host ID and information ID of information stored in the one host from input pairs of the information ID and the host ID. Then, the retrieval method decision unit 112 calculates a retrieval time cost of the remote retrieval and a retrieval time cost of the mobile agent retrieval for the one host (S31). As for definition or calculation of the retrieval time cost, various methods may be used. Furthermore, as for evaluation parameters to calculate the retrieval time cost, various parameters can be taken into consideration based on the definition method of the retrieval time cost. For example, a retrieval execution time, a communication time, a size of retrieval request, and a size of information may be utilized as the parameter. Furthermore, in case of calculating the retrieval time cost, current load of each host or current communication status of network for each host may be taken into consideration. In order to detect the load and the communication status, for example, a data exchange between hosts is periodically executed or dummy retrieval between hosts is periodically executed.

Next, the retrieval method decision unit 112 compares the retrieval time cost of the mobile agent retrieval with the retrieval time cost of the remote retrieval (S32). If the former is lower, the mobile agent retrieval is assigned to the host as the retrieval method (S34). If the former is not lower, the remote retrieval is assigned to the host as the retrieval method (S33). If the retrieval method is not assigned to at least one host in all pairs of the information ID and the host ID (S35), the processing is returned to S31. If the retrieval method is assigned to all hosts in all pairs of the information ID and the host ID (S35), the processing is completed.

In FIG. 7, if the retrieval time cost of the mobile agent retrieval is equal to the retrieval time cost of the remote retrieval, the remote retrieval is assigned to the host. However, in this case, the mobile agent retrieval may be assigned to the host. For example, assume that pairs of the information ID and the host ID "(1, A), (2, A), (3, A), (4, A), (5, B), (6, C)" are input, and the evaluation parameter to calculate the retrieval time cost is predetermined as follows.

A size of retrieval request of remote retrieval . . . 1 unit quantity

A size of retrieval request of mobile agent retrieval . . . 1 unit quantity

A size of each information . . . 10 unit quantity

A communication cost between two hosts . . . 10 unit time/1 unit quantity

A retrieval execution time at each host . . . 10 unit time/1 information

In case of executing the remote retrieval for four information in the host A, first, as for information M1, the following values are calculated.

A cost of sending of retrieval request massage from the host D to the host A=1×10=10 unit time A cost of retrieval time of information M1 at the host A=1×10=10 unit time A cost of transferring of information M1 from the host A to the host D=10×10=100 unit time Accordingly, the retrieval time cost of the remote retrieval for information M1 is calculated as follows.

10+10+100=120 unit time

In the same way, calculation for information C2, M3, C4, is executed. As a result, the retrieval time cost of the remote retrieval for the host A is calculated as follows.

$$120 \times 4 = 480 \text{ unit time}$$

On the other hand, in case of executing the mobile agent retrieval for four information in the host A, the following values are calculated.

A cost of moving of a mobile agent including retrieval request from the host D to the host A=1×10=10 unit time A cost of retrieval time of information M1, C2, M3, C4 at the host A=4×10=40 unit time A cost of moving of the mobile agent including information M1, C2, M3, C4 from the host A to the host D=1×10+(4×10)×10=410 unit time Accordingly, the retrieval time cost of the mobile agent retrieval for the host A is calculated as follows.

$$10 + 40 + 410 = 460 \text{ unit time}$$

By comparing the retrieval time cost of the mobile agent retrieval with the retrieval time cost of the remote retrieval, the latter is lower. Accordingly, the mobile agent retrieval is assigned to the host A as the retrieval method.

Next, in case of executing the remote retrieval for information M5 in the host B, the following values are calculated.

A cost of sending of retrieval request message from the host D to the host B=1×10=10 unit time A cost of retrieval time of information M5 at the host B=1×10=10 unit time A cost of transferring of information M5 from the host B to the host D=10×10=100 unit time Accordingly, the retrieval time cost of the remote retrieval for the host B is calculated as follows.

$$10 + 10 + 100 = 120 \text{ unit time}$$

On the other hand, in case of executing the mobile agent retrieval for information M5 in the host B, the following values are calculated.

A cost of moving of a mobile agent including retrieval request from the host D to the host B=1×10=10 unit time A cost of retrieval time of information M5 at the host B=1×10=10 unit time A cost of moving of the mobile agent including information M5 from the host A to the host D=1×10+(1×10)×10=110 unit time Accordingly, the retrieval time cost of the mobile agent retrieval for the host B is calculated as follows.

$$10 + 10 + 110 = 130 \text{ unit time}$$

By comparing the retrieval time cost of the mobile agent retrieval with the retrieval time cost of the remote retrieval, the former is lower. Accordingly, the remote retrieval is assigned to the host B as the retrieval method.

As for the host C, the remote retrieval is assigned in the same way as the host B.

As mentioned-above, after the retrieval method is determined for each host, the retrieval execution unit 113 executes the retrieval for each host using the retrieval method decided by the retrieval method decision unit 112. For example, in the above-mentioned example, the following three retrievals are executed.

The mobile agent retrieval for the master of information of information ID "1", the copy of information of information ID "2", the master of information of information ID "3", the copy of information of information ID "4" in the host A The remote retrieval for the master of information of information ID "5" in the host B The remote retrieval for the master of information of information ID "6" in the host C The retrieval execution unit 113 variously executes a plurality of retrieval methods decided by the retrieval method decision unit 112. For example, each retrieval of the plurality of retrieval methods is executed in order, or all retrieval requests of the plurality of retrieval methods are simultaneously sent to the retrieval destination host. After the retrieval result information is received from the retrieval destination host, for example, the retrieval result information is displayed, preserved, transferred to another host, or utilized for another purpose.

Next, the retrieval time cost according to the present embodiment is compared with the retrieval time cost according to the prior art. Concretely, in the present embodiment, the retrieval time cost of the mobile agent retrieval for information M1, C2, M3, C4 in the host A, the retrieval time cost of the remote retrieval for information M5 in the host B, and the retrieval time cost of the remote retrieval for information M6 in the host C are calculated (case (1)). In the prior art, the retrieval time cost of the remote retrieval for six information M1, C2, M3, C4, M5, M6 is calculated (case (2)), and the retrieval time cost of the mobile agent retrieval for six information M1, C2, M3, C4, M5, M6 is calculated (case (3)). As a method for calculating the evaluation parameter and the retrieval time cost, the above-mentioned example is used.

Case (1): In the Present Embodiment.

As mentioned above, the total retrieval time cost is calculated as follows.

$$460 + 120 + 120 = 700 \text{ unit time}$$

Case (2): The Remote Retrieval in the Prior Art.

As mentioned above, the 120 unit time cost for one information. Accordingly, total time cost for six information is calculated as follows.

$$6 \times 120 = 720 \text{ unit time}$$

Case (3): The Mobile Agent Retrieval in the prior art.

For example, if the mobile agent program moves in order of the host A, host B, host C, the following values are calculated.

A cost of moving of a mobile agent including retrieval request from the host D to the host A=1×10=10 unit time A cost of retrieval time for information M1, C2, M3, C4 in the host A=4×10=40 unit time A cost of moving of the mobile agent including information M1, C2, M3, C4 from the host A to the host B=1×10+(4×10)×10=410 unit time A cost of retrieval time of information M5 in the host B=1×10=10 unit time A cost of moving of the mobile agent including information M1, C2, M3, C4, M5 from the host B to the host C=1×10+(5×10)×10=510 unit time A cost of retrieval time for information M6 in the host C=1×10=10 unit time A cost of moving of the mobile agent including information M1, C2, M3, C4, M5, M6 from the host C to the host D=1×10+(6×10)×10=610 unit time Accordingly, the total retrieval time cost of the mobile agent retrieval for the hosts A, B, C, is calculated as follows.

$$10+40+410+10+510+10+610=1600 \text{ unit time}$$

As mentioned above, in the present embodiment, by devising combination of the remote retrieval and the mobile agent retrieval, the minimum retrieval time cost is obtained and fast retrieval can be executed in comparison with the prior art.

In the above-mentioned example of the present embodiment, if at least two hosts to execute the mobile agent retrieval are obtained, the mobile agent retrieval is separately executed for each host. However, in this case, the mobile agent retrieval for each host can be merged in order to reduce the total retrieval time cost. In this case, one mobile agent program goes to each host to execute the mobile agent retrieval.

Figure 8:
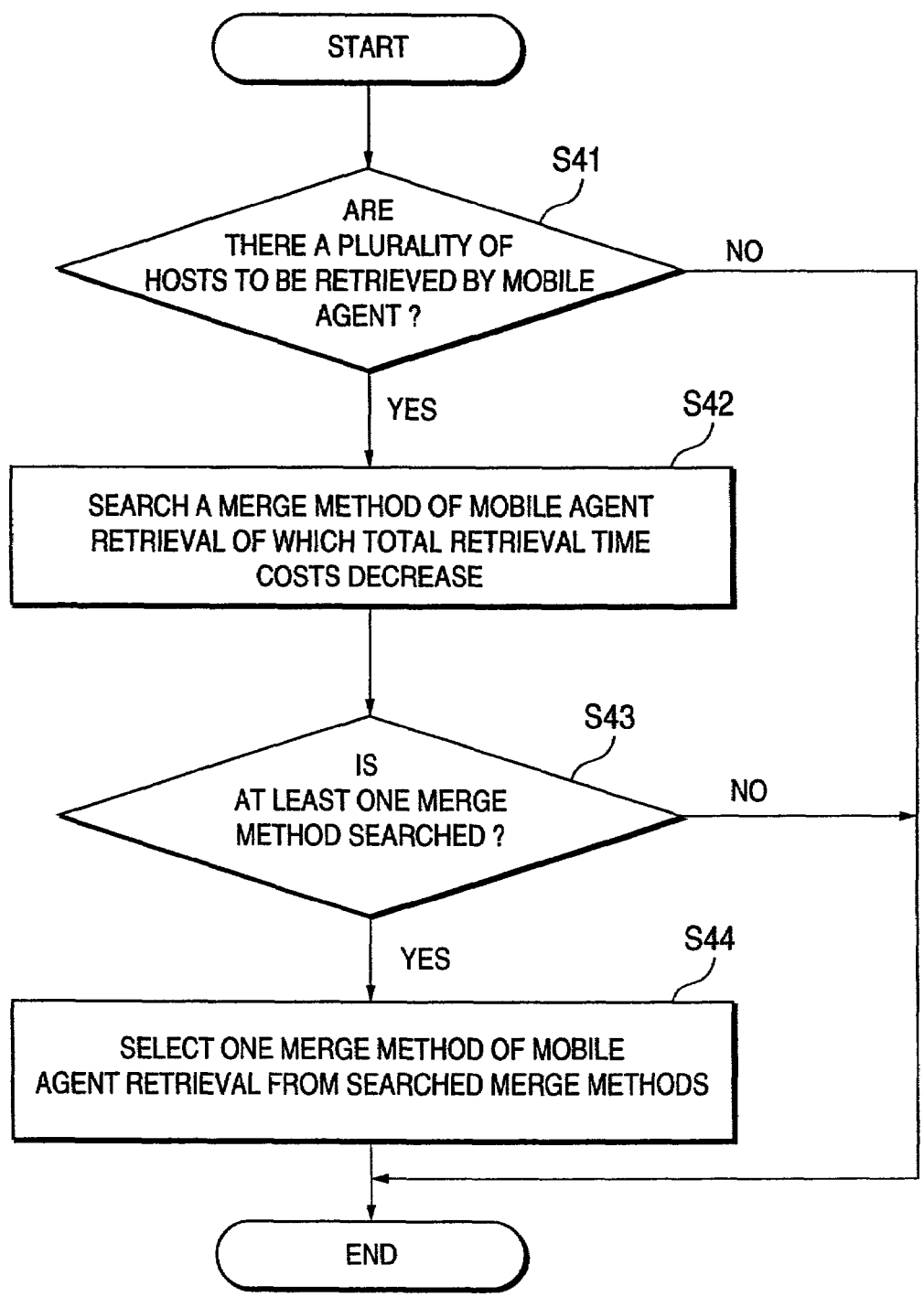
FIG. 8 is a flow chart of another decision processing of the retrieval method decision unit according to various embodiments of the present invention.

FIG. 8 is a flow chart of merge processing of the mobile agent retrieval of the retrieval method decision unit 112 following the flow chart in FIG. 7. In the retrieval method for each host determined by the retrieval method decision unit 112, if a plurality of hosts to execute the mobile agent retrieval exist (S41), a merge method (retrieval root) of the mobile agent retrieval for each host is searched in order to reduce the total retrieval time cost (S42). If at least one merge method of the mobile agent retrieval is searched (S43), the retrieval method decision unit 112 selects one merge method (S44). On the other hand, if a plurality of hosts to execute the mobile agent retrieval do not exist (S41), or if the merge method of the mobile agent retrieval to reduce the total retrieval time cost is not searched (S43), the retrieval method decision unit 112 decides not to merge a plurality of the mobile agent retrievals. For example, in FIGS. 2 and 9, assume that: information IDs "1~8" are input to the routing retrieval unit 111 in the host D, an indication without regard to master or copy as the retrieval object is input, and pairs of the information ID and the host ID "(1, A), (2, A), (3, A), (4, A), (5, B), (6, C), (7, A), (8, B)" are obtained. Furthermore, assume that: the host A storing information of the information IDs "1, 2, 3, 4, 7" is decided as the mobile agent retrieval, the host B storing information of the information IDs "5, 8" is decided as the mobile agent retrieval, and the host C storing information of the information ID "6" is decided as the remote retrieval. In this case, the following three types of the retrieval time cost are calculated.

(1) The retrieval time cost 1 (=(retrieval time cost of the mobile agent retrieval for the host A)+(retrieval time cost of the mobile agent retrieval for the host B)) in case that the mobile agent retrieval is separately executed for the host A and the host B.

(2) The retrieval time cost 2 in case that the mobile agent retrieval is locally executed in the host A after the mobile agent moves from the host D to the host A, the mobile agent retrieval is locally executed in the host B after the mobile agent moves from the host A to the host B, and the mobile agent with the retrieval result returns to the host D.

(3) The retrieval time cost 3 in case that the mobile agent retrieval is locally executed in the host B after the mobile agent moves from the host D to the host B, the mobile agent retrieval is locally executed in the host A after the mobile agent moves from the host B to the host A, and the mobile agent with the retrieval result returns to the host D.

Then, the retrieval method decision unit 112 compares the retrieval time costs 1, 2, 3, and selects the method of the mobile agent retrieval having the minimum retrieval time cost. For example, if the retrieval time cost 1 is minimum, the mobile agent retrieval is separately executed for the host A and the host B. If the retrieval time cost 2 (or 3) is minimum, the mobile agent retrieval is executed for the host A and the host B in order while the mobile agent goes to the host A and the host B. A factor effecting the retrieval time cost is determined by evaluation parameter such as a size of retrieval request of the remote retrieval, a size of retrieval request of the mobile agent, a size of each information, a communication cost between two hosts, and a retrieval execution time at each host. Furthermore, if at least three hosts potentially require a mobile agent retrieval, all types of the retrieval methods executed for each host may be evaluated.

In the above-mentioned explanation, all mobile agent retrieval methods (retrieval routing) are evaluated. However, each mobile agent retrieval method selected based on predetermined policy may be respectively evaluated. In comparison with the retrieval time cost of the mobile agent retrieval separately executed for each host, if a predetermined improvement is found in particular mobile agent retrieval method (For example, a difference between both retrieval time costs is above a threshold, or a quotient between both retrieval time costs is below a threshold), the particular mobile agent retrieval method may be determined at the timing. Furthermore, in this case, a mobile agent retrieval method of which a host including a fewer number of information as retrieval object is first retrieved may be preferably evaluated. Furthermore, an upper limit of number of types of the mobile agent retrieval method to be evaluated may be previously determined. In this case, if an improvement of the retrieval time cost is not found in the upper limit of number of types of the mobile agent retrieval method, the mobile agent retrieval may be separately executed for each host.

In the above-mentioned embodiment, the master•copy management unit 21 manages a correspondence relation among the information ID, the host ID, and the flag representing whether information of the information ID is a master or a copy. However, if the retrieval unit 11 always retrieves both master and copy for all information, i.e., if a component without distinction of master and copy is adopted in the retrieval unit 11, the master•copy management unit 21 may manage a correspondence relation between the information ID and the host ID, and may not manage a distinction between master and copy.

Figure 10:
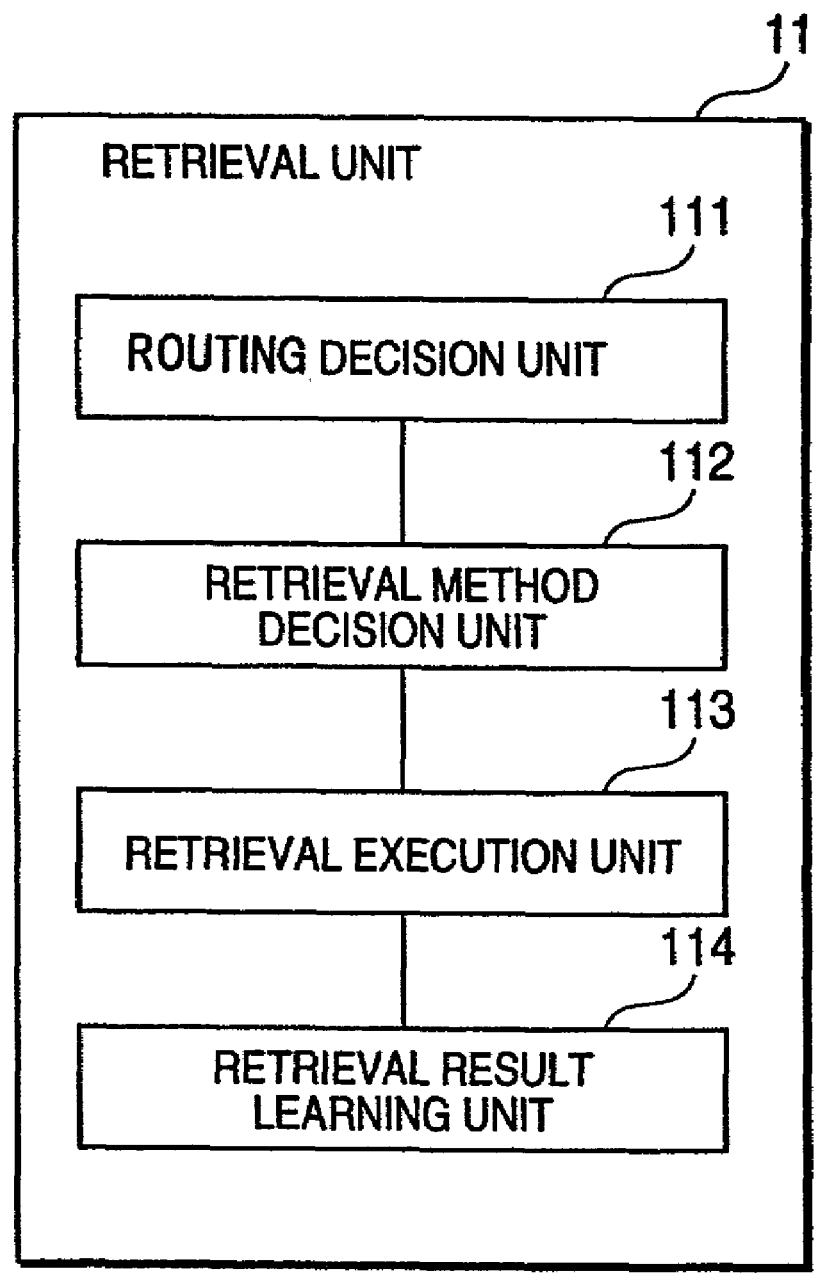
FIG. 10 is a block diagram of another example of the retrieval unit according to various embodiments of the present invention.

As mentioned-above, the retrieval method decision unit 112 decides the retrieval method based on the evaluation parameter such as the retrieval execution time, the communication cost, and the size of information. However, the evaluation parameter often includes a dynamic change factor. Accordingly, in order to determine a retrieval method closer to the most suitable solution, the retrieval unit 11 in the host 1 may prepare a function to learn the retrieval result. FIG. 10 is a component example of the retrieval unit 11 of this case. As shown in FIG. 10, the retrieval unit 11 includes the routing decision unit 111, the retrieval method decision unit 112, the retrieval execution unit 113, and a retrieval result learning unit 114. The routing decision unit 111, the retrieval method decision unit 112, and the retrieval execution unit 113 are the same as each unit in FIG. 3.

Hereinafter, the retrieval result learning unit 114 is explained. After the retrieval execution unit 113 retrieves each information using the retrieval method selected by the retrieval method decision unit 112, the retrieval result learning unit 114 preserves the retrieval result for learning. For example, as for all or a part of variable parameter in the evaluation parameter, the retrieval result leaning unit 114 stores actual value in case of retrieving the information in the past, such as the retrieval time and the information size. By executing statistical processing or predictive processing if necessary, the retrieval result learning unit 114 calculates the evaluation parameter expected for more suitable retrieval result. Concretely, by unit of combination of the information ID, a request destination host (the host ID) and a request source host, the retrieval result learning unit 114 obtains actual results data and compares the actual results data with standard results data (or previous actual results data) for each evaluation parameter (the size of retrieval request of the remote retrieval, the size of retrieval request of the mobile agent retrieval, the size of information, the communication cost between two hosts, the retrieval execution time at each host) corresponding to the combination. The retrieval result learning unit 114 then updates each evaluation parameter in proportion to a difference between the actual result data and the standard result data. Furthermore, in order to learn, a dummy retrieval may be periodically executed or executed while an actual retrieval request is not pending. The dummy retrieval result is then reflected in the learning. Furthermore, in case that the routing decision unit 111 utilizes the evaluation parameter including dynamic change factor, the retrieval result learning unit 114 may learn the evaluation parameter. In this way, in case that the retrieval method decision unit 112 decides the retrieval method, additional actual evaluation parameters can be utilized.

Hereinafter, a hardware component and a software component of the present embodiment are explained. Each function loaded in the host is executable in hardware or software (a program to execute predetermined means in the computer, a program to function the computer as predetermined means, or a program to realize a predetermined function in the computer). In case of realizing each function in software, the program can be delivered by a recording medium or a communication medium. In case of composing each function as software, by using a multi-processor, parallel processing can be executed in order to process at a high speed. A format of the program is not specially limited. Furthermore, in case of composing each function as the hardware, it can be formed as a semiconductor device, a board or IC card loading the semiconductor device.

A memory can be used to store instructions for performing the process described above. Such a memory can be a CD-ROM, a floppy disk, a hard disk, a magnetic tape, a semiconductor memory, and so on.

In the present invention, based on a situation which host stores the information to be retrieved, the retrieval can be executed by selectively combining a plurality of retrieval methods. Accordingly, information retrieval can be effectively realized for the database in the host through the network.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for collecting information in a plurality of host computers through a network, each of the plurality of host computers having a database, the system comprising:
in at least one of the plurality of host computers, a management unit configured to store a management table representing a correspondence between an information identifier of requested information and a host identifier of each of those host computers that store the requested information; and
in each of the plurality of host computers:
a correspondence acquirement unit configured to acquire a correspondence relation information between the information identifier of the requested information and host identifiers of host computers each storing the requested information by referring to the management table, in response to an information retrieval request with the information identifier,
a first decision unit configured to choose at least one of the host computers from which to retrieve the requested information by referring to the correspondence relation information,
a second decision unit configured to evaluate a retrieval time cost of each of a plurality of retrieval methods used for the at least one host computer, the plurality of retrieval methods including a remote retrieval and a mobile agent retrieval, and to select one retrieval method whose retrieval time cost is minimum from the plurality of retrieval methods,
wherein the remote retrieval represents that the information retrieval request is sent to the chosen at least one host computer from which the requested information is to be retrieved and that a result of the information retrieval request is received from the chosen at least one host computer, and wherein the mobile agent retrieval represents that an executable retrieval program including the information retrieval request is sent to the chosen at least one host computer from which the requested information is to be retrieved for local execution, and that a result of the information retrieval request is added to the executable retrieval program and then returned to the host computer sending the executable retrieval program; and
a retrieval unit configured to retrieve the requested information, based on the one retrieval method from the at least one host computer.

2. The system according to claim 1, wherein the management table includes a flag representing whether the information stored in the host computer is a master or a copy.

3. The system according to claim 2, wherein said correspondence acquirement unit searches the correspondence relation information between the information identifier of the requested information and the host identifier of the host computer which stores the master of the requested information, when the information retrieval request includes a request for a master.

4. The system according to claim 2, wherein said first decision unit selects the host computer which stores the master of the requested information by referring to the correspondence relation information, when the information retrieval request includes a request for a master.

5. The system according to claim 1, wherein said first decision unit selects the at least one host computer to retrieve the requested information from the plurality of host computers by referring to the correspondence relation information in order to minimize the number of the host computers to retrieve.

6. The system according to claim 1, wherein said first decision unit chooses its own host computer as the at least one host computer from the plurality of host computers by referring to the correspondence relation information if its own host computer stores the requested information.

7. The system according to claim 2, wherein said first decision unit selects one host computer which stores the most requested information from the plurality of host computers by referring to the correspondence relation information, and selects another host computer which stores the requested information excluding the most requested information from the plurality of host computers by referring to the correspondence relation information.

8. The system according to claim 1, wherein said second decision unit calculates the retrieval time cost of each of the plurality of retrieval methods based on a current load of the at least one host computer and a current communication status of the network.

9. The system according to claim 1, wherein said second decision unit compares the retrieval time cost of the mobile agent retrieval with the retrieval time cost of the remote retrieval, and selects one retrieval of lower retrieval time cost from the mobile agent retrieval and the remote retrieval.

10. The system according to claim 8, wherein said second decision unit calculates the retrieval time cost of each retrieval method based on evaluation parameter including at least one of a retrieval execution time, a communication time, a size of the information retrieval request, and a size of the requested information.

11. The system according to claim 1, wherein if said second decision unit selects the mobile agent retrieval as the retrieval method to be executed for at least two of the host computers, then said second decision unit merges each method of the mobile agent retrieval for the at least two host computers in order to minimize a total retrieval time cost of the at least two host computers, thereby resulting in a merged method, wherein the merged method represents that the executable retrieval program including retrieval requests for the at least two host computers is sent to one of the at least two host computers, that a first local retrieval is executed by the one of the at least two host computers using the executable retrieval program, thereby resulting in a first retrieval result that is added to the executable retrieval program, that the executable retrieval program is sent from the one of the at least two host computers to the other of the at least two host computers, that a second retrieval is executed by the other of the at least two host computers using the executable retrieval program, thereby resulting in a second retrieval result that is added to the executable retrieval program, and that the retrieval program is returned to the host computer sending the executable retrieval program.

12. The system according to claim 11, wherein said second decision unit calculates a total retrieval time cost in case that the mobile agent retrieval is separately executed for each of the at least two host computers, calculates a total retrieval time cost in case that the mobile agent retrieval is cyclically executed for each of the at least two host computers, and selects the method of the mobile agent retrieval having the shortest total retrieval time cost.

13. The system according to claim 12, wherein said second decision unit respectively calculates a total retrieval time cost for each route of cyclical execution of the mobile agent retrieval for the at least two host computers.

14. The system according to claim 1, wherein if the host computer which received the information retrieval request does not include the management unit, then said correspondence acquirement unit inquires of another host computer including the management unit through a network by using the information identifier of the requested information as a retrieval key.

15. The system according to claim 1, wherein if the host computer that received the information retrieval request includes the management unit, then said correspondence acquirement unit acquires the correspondence relation information from the management table by using the information identifier of the requested information as a retrieval key.

16. The system according to claim 1, wherein said management unit additionally is configured to update the management table by exchanging a message with each of the host computers.

17. The system according to claim 1, further comprising a learning unit configured to update the evaluation parameter used for decision of said first decision unit and said second decision unit based on an actual retrieval execution result.

18. The system according to claim 17, wherein said learning unit acquires the actual retrieval execution result for each combination of the information identifier, a request source host computer, and a request destination host computer, and updates the evaluation parameter of the combination based on a difference between the actual retrieval execution result and a standard retrieval execution result.

19. A method for collecting information in a plurality of host computers through a network, each of the plurality host computers having a database, the method comprising:
   storing a management table representing a correspondence between an information identifier of requested information and a host identifier of each of those host computers that store the requested information;
   acquiring correspondence relation information between the information identifier of the requested information and host identifiers of those host computers that store the requested information by referring to the management table, in response to an information retrieval request with the information identifier;
   choosing at least one of the host computers from which to retrieve the requested information by referring to the correspondence relation information;
   evaluating a retrieval time cost of each of a plurality of retrieval methods used for the at least one host computer, the plurality of retrieval methods including a remote retrieval and a mobile agent retrieval,
   wherein the remote retrieval represents that the information retrieval request is sent to the chosen at least one host computer from which the requested information is to be retrieved and that a result of the information retrieval request is received from the chosen at least one host computer, and wherein the mobile agent retrieval represents that an executable retrieval program including the information retrieval request is sent to the chosen at least one host computer from which the requested information is to be retrieved for local execution, and that a result of the information retrieval request is added to the executable retrieval program and then returned to the host computer sending the executable retrieval program;
   choosing one retrieval method whose retrieval time cost is minimum from the plurality of retrieval methods; and
   retrieving the requested information based on the one retrieval method, from the at least one host computer.

20. A computer readable medium storing computer readable program code for causing a computer to collect information stored in a plurality of host computers through a network, each of the plurality of host computers having a database, said computer readable program code having:
   a first program code for storing a management table representing a correspondence between an information identifier of requested information and a host identifier of each of those host computers storing the requested information;

a second program code for acquiring correspondence relation information between the information identifier of the requested information and host identifiers of those of the host computers that store the requested information by referring to the management table, in response to an information retrieval request with the information identifier;

a third program code for choosing at least one of the host computers from which to retrieve the requested information by referring to the correspondence relation information;

a fourth program code for evaluating a retrieval time cost of each of a plurality of retrieval methods used for the at least one host computer, the plurality of retrieval methods including a remote retrieval and a mobile agent retrieval, wherein the remote retrieval represents that the information retrieval request is sent to the chosen at least one host computer from which the requested information is to be retrieved and that a result of the information retrieval request is received from the chosen at least one host computer, and wherein the mobile agent retrieval represents that an executable retrieval program including the information retrieval request is sent to the chosen at least one host computer from which the requested information is to be retrieved for local execution, and that a result of the information retrieval request is added to the executable retrieval program and then returned to the host computer sending the executable retrieval program;

a fifth program code for selecting one retrieval method whose retrieval time cost is minimum from the plurality of retrieval methods; and a sixth program code for retrieving the requested information based on the one retrieval method from the at least one host computer.

* * * * *